Feb. 13, 1951 — B. N. JONES — 2,541,767
PALM TREE TRIMMING MACHINE
Filed July 7, 1947 — 5 Sheets-Sheet 2
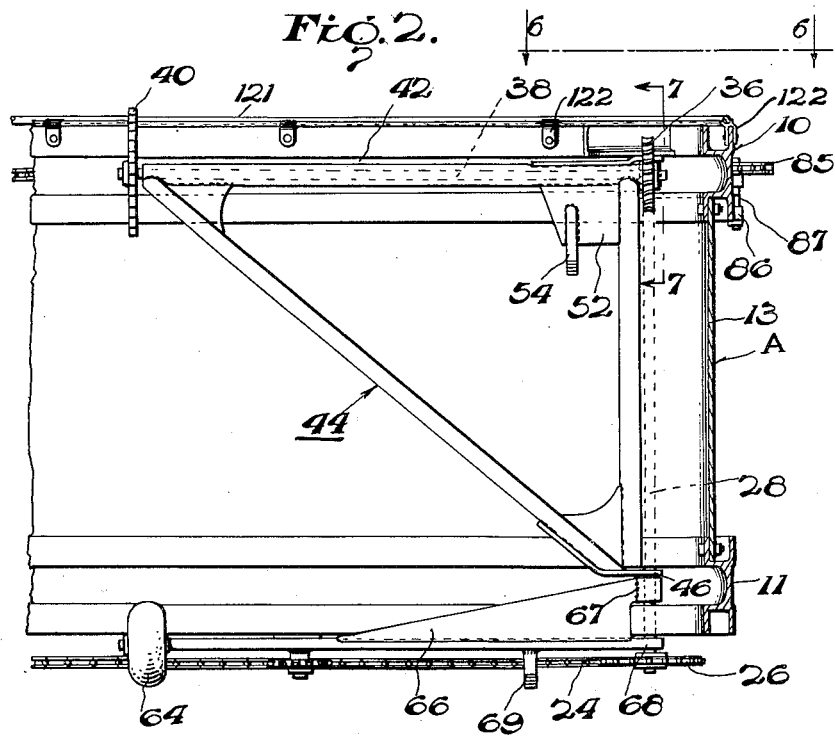
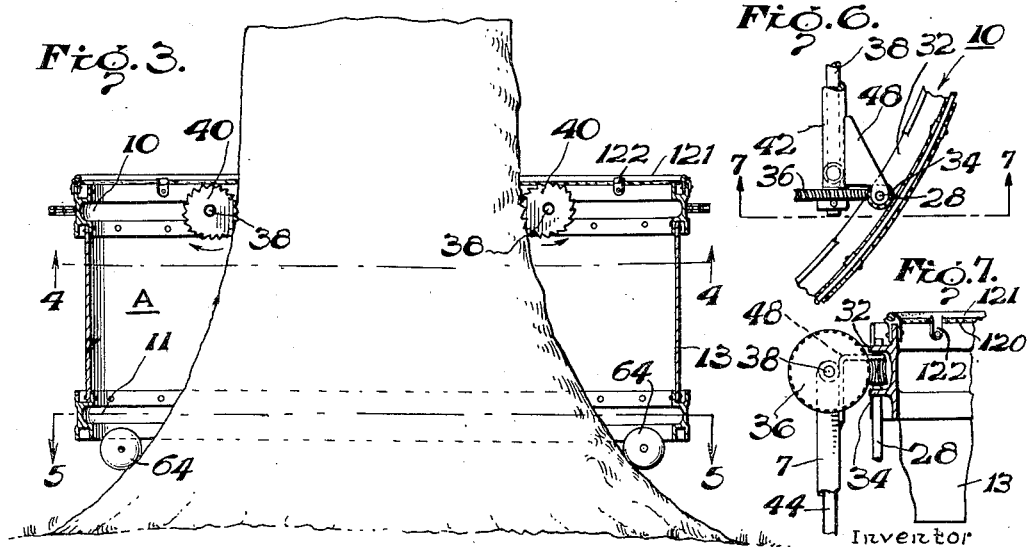

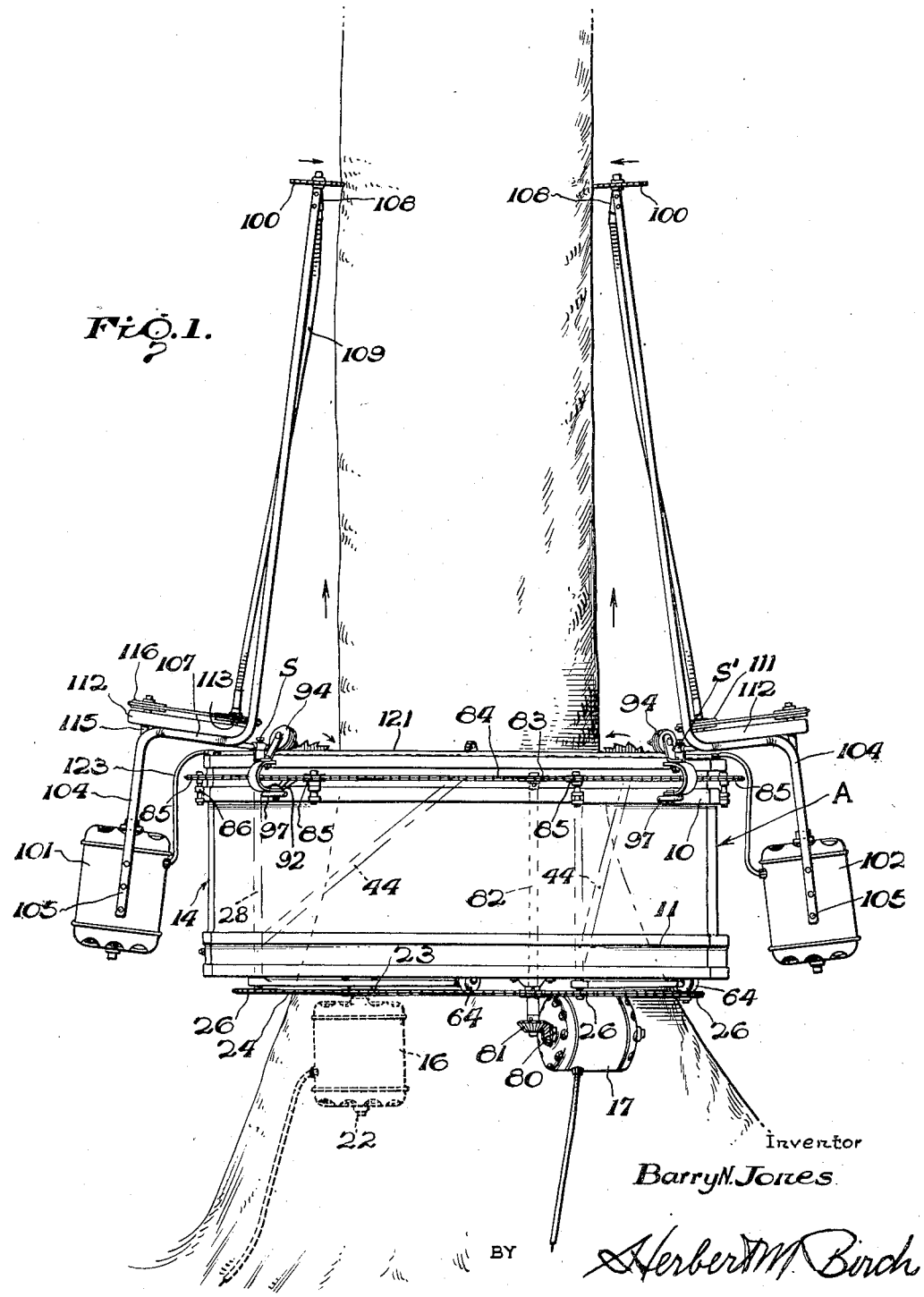

Inventor
Barry N. Jones.
BY Herbert M. Birch
Attorney

Feb. 13, 1951 B. N. JONES 2,541,767
PALM TREE TRIMMING MACHINE
Filed July 7, 1947 5 Sheets-Sheet 4
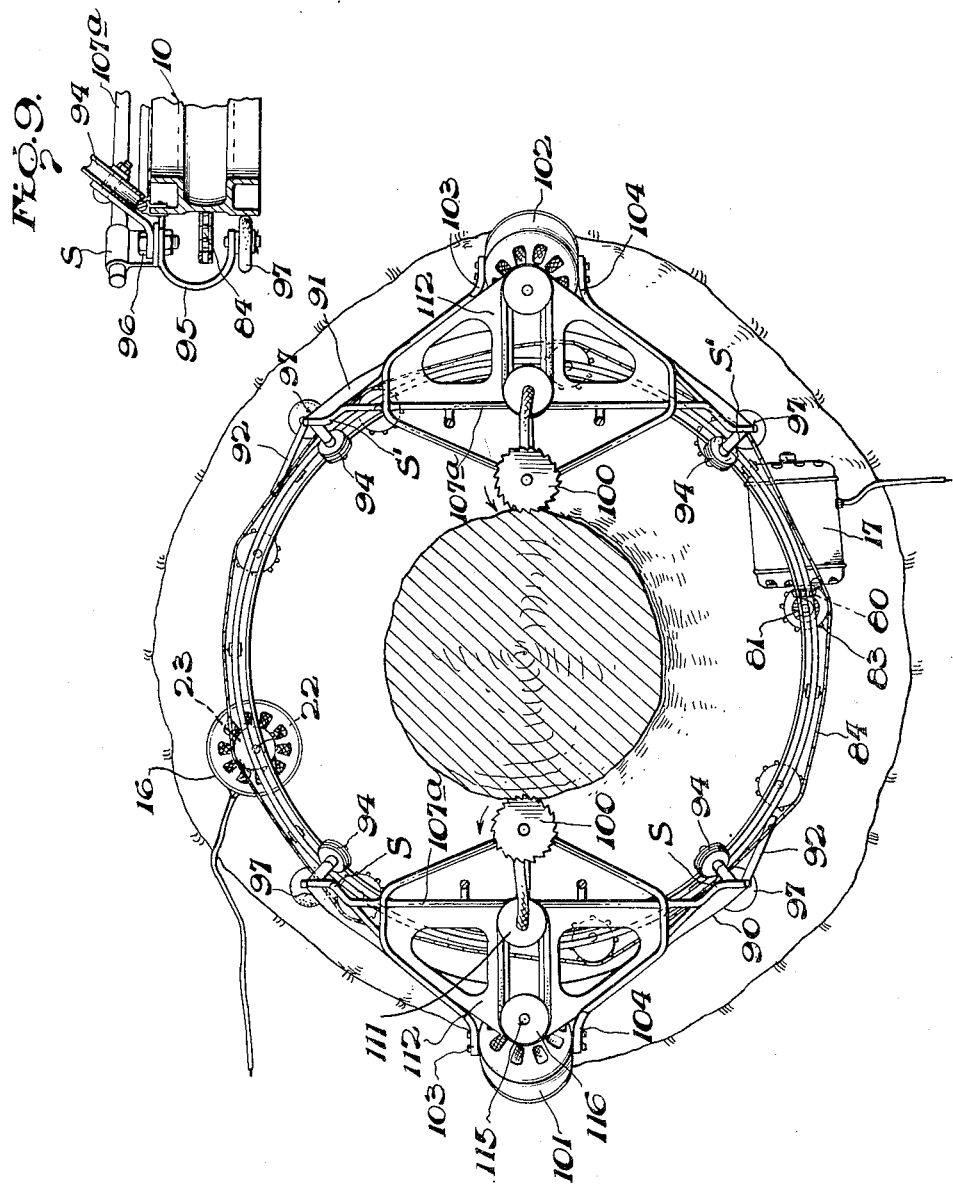
Inventor
Barry N. Jones.
BY
Herbert M. Birch
Attorney

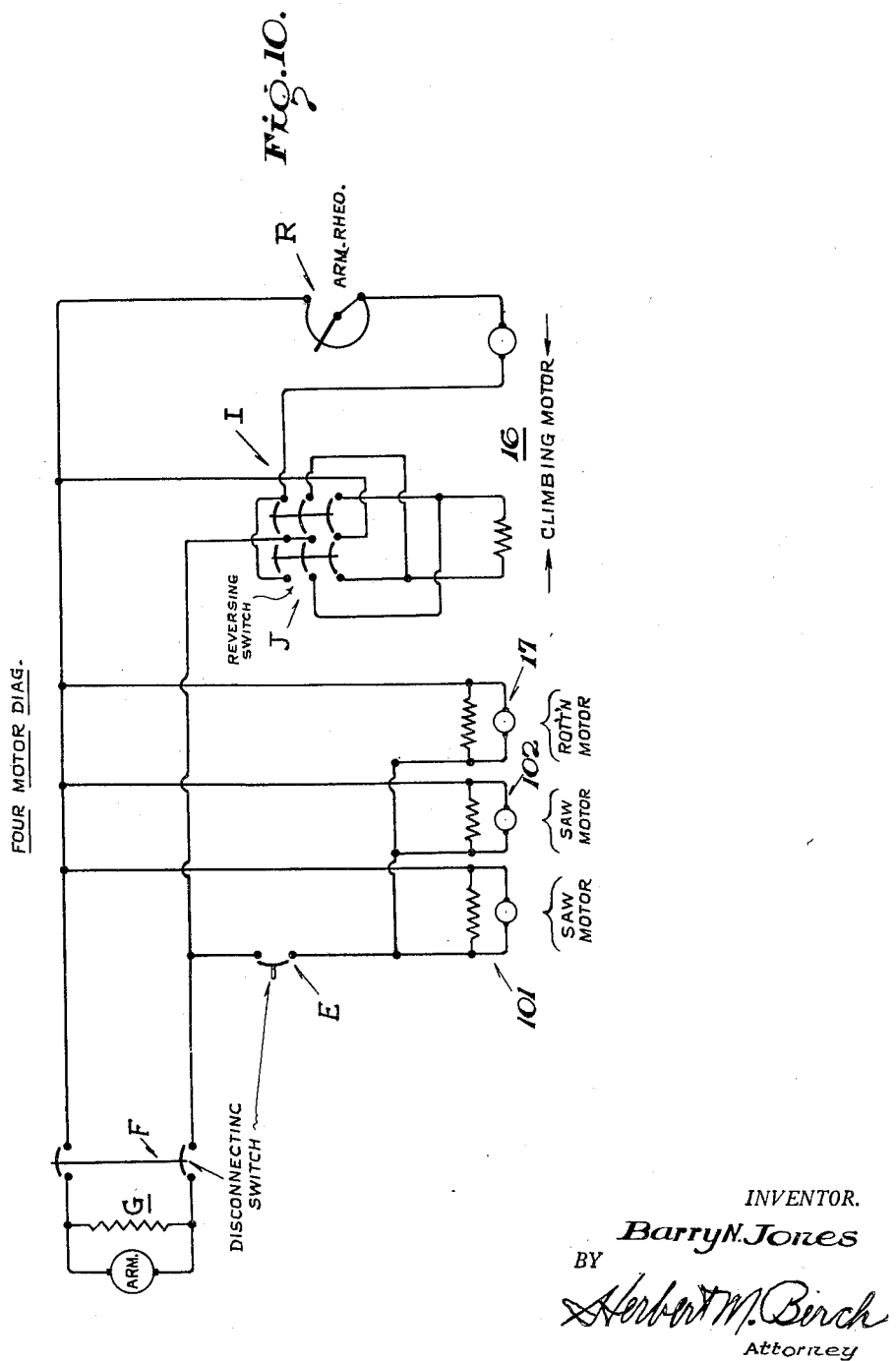

Patented Feb. 13, 1951

2,541,767

UNITED STATES PATENT OFFICE 2,541,767

PALM TREE TRIMMING MACHINE

Barry N. Jones, Pasadena, Calif.

Application July 7, 1947, Serial No. 759,341

8 Claims. (Cl. 47—1)

1

The present invention relates generally to machines for trimming growths of foliage and the like from the trunks of growing trees and particularly to machines for trimming fronds from the trunks of palm trees.

Heretofore it has been necessary to trim the fronds from palm trees manually. These fronds which grow spirally around the palm tree trunk are a definite problem in large cities particularly as they collect large quantities of dust and other forms of debris. When it is attempted to trim these fronds it is necessary for the trimmer to use a sharp cutting implement and gradually sever the fronds as he climbs the tree. Obviously this is an expensive, slow, dirty and tedious job and an automatic trimmer of some sort has long been needed. Accordingly, the principal object of the present invention is to provide a novel machine for trimming fronds from a palm tree which completely encircles the trunk of the tree and which automatically climbs and cuts the palm fronds from the tree when power is supplied to operate the machine.

Another object is to provide a machine for severing the fronds from the trunk of a palm tree having cutting members adapted to travel around the tree trunk as the machine itself climbs upward along the trunk to thereby effect a gradual helical cutting action in conformity with the upward spiral growth of the palm fronds around the trunk of the tree.

A further object is to provide a power driven machine for trimming palm tree trunks wherein the cutting implements for trimming the same are rotatable about the trunk of the tree and are forced inwardly into cutting engagement by centrifugal force as said cutting implements travel around the tree trunk.

Another object is to provide a novel machine for trimming the fronds from palm trees primarily of the Washingtonia Robusta and Filifera species comprising a structure adapted to completely encircle the trunk of a palm tree and serving to mount climbing means for propelling the structure upward along the trunk of the tree, said structure also serving to support cutters mounted upon a circular trolley connected to a source of electric power, said cutters having electric motors swingable radially outward from the tree trunk by centrifugal force as they are driven around the structure, to thereby direct the cutters into engagement with the tree trunk.

With these and other objects in view, the invention consists in the construction, arrangement and combination of parts hereinafter described and particularly pointed out in the claims, it being understood that I do not intend to limit myself to the details of construction.

In the drawings, like parts throughout the several views are given like numerals and are

2 thus identified in the following detailed description:

Figure 1 is a side elevational view of one form of my machine mounted for operation around the trunk of a tree.

Figure 2 is a cut away cross section view of the climbing mechanism and the centering guide wheels as taken on the line 2—2 of Fig. 4.

Figure 3 is a cross section view of the climbing mechanism and guide wheels mounted in the base collar applied around the tree trunk as taken on the line 3—3 of Fig. 4, and illustrating the pronounced taper of such tree trunks omitting the climbing wheel brackets and mechanism for driving the same.

Figure 6 is a fragmentary detail view showing the upper ring of the base collar and the upper pivot connection of one of the climbing wheel brackets mounted inside the curvature of the upper ring on the line 6—6 of Figure 2.

Figure 7 is a fragmentary end detail view of the interior structure shown in Figure 6, taken on line 7—7 of Figure 6.

Figure 8 is a top plan view of the machine illustrated in Figure 1, showing the cutter mechanism but omitting the climbing mechanism.

Figure 9 is a fragmentary cross section view of the trolley mounting and the pivotal connection of the saw or cutter saddle mechanism.

Figure 10 is a diagrammatic illustration of an electric circuit for supplying current to the climbing and cutter mechanisms.

Figure 4:
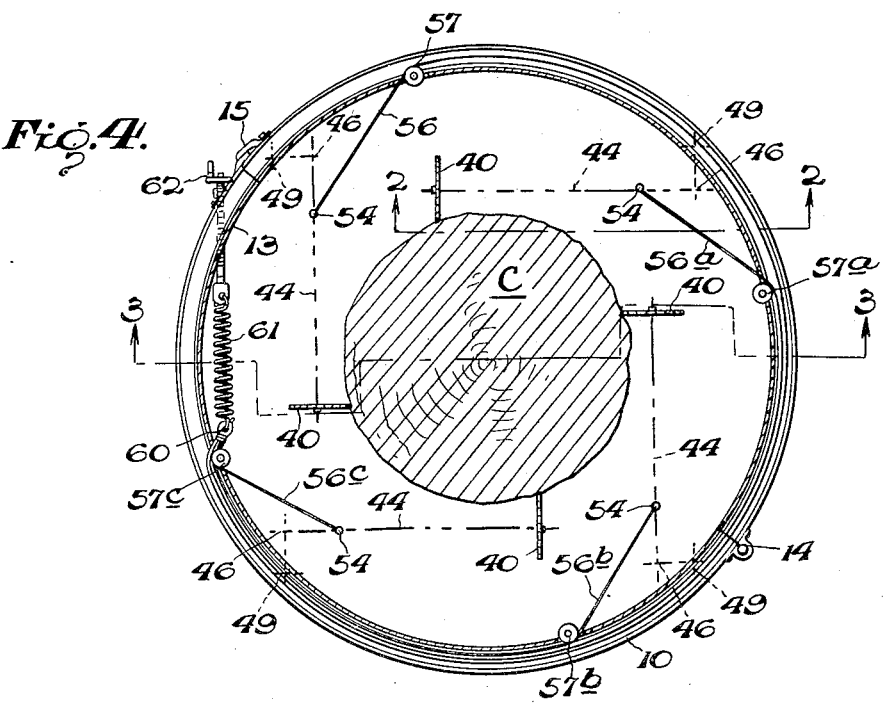
Figure 4 is a semi-diagrammatic view taken on the line 4—4 of Fig. 3 and illustrating the mounting of the climbing wheels.

Referring to the drawings and first with particular reference to Figure 1, the machine comprises an annular frame or base collar A with upper and lower connected rings 10 and 11, respectively. The frame or base collar A and its constituent ring members are connected by a web 13 and are formed in half sections coupled together by a hinge 14 and upper and lower fasteners 15, best shown in Figures 4 and 5. This hinge connection permits the frame or base collar A to be positioned around the trunk B of a palm tree or the like to be trimmed by the several parts carried by the ring members 10 and 11, hereinafter to be described.

The lower ring 11 positioned toward the base of the tree serves as a support for drive means including two electric motors, one reversible motor 16 for driving the tree climbing mechanism and the other motor 17 for driving the trolley drive means mounted on the upper ring 10.

Climbing mechanism

First considering the climbing motor 16, in Figures 1 and 8, the armature shaft 22 of this motor has keyed to it a sprocket or spur gear 23. This motor 16 is reversible for the purpose explained under the heading "Operation." The sprocket 23 meshes and drives a chain 24 mounted around idler sprockets 26 positioned below the lower ring 11, see Figure 1. Each of the sprocket wheels 26 are keyed to an elongated shaft 28 with a worm gear 29 at their respective upper ends, which may be four in number as shown. These shafts 28 extend upward as shown in Figures 2 and 7, through two pairs of spaced bearing lugs 32 and 34 formed with vertically aligned openings to receive each respective shaft and said lugs are secured or formed from the exterior of each ring 10 and 11. As shown in Figure 7, the worm gear 29 on the end of shaft 28 is spaced between the upper pair of these lugs and meshes with a second relatively larger worm gear 36 on a shaft 38.

The climbing members, such as the chisel toothed wheels 40 are secured to the opposite end of shaft 38, there being four in number. It is of course understood that any number may be utilized, if desired. The worm driven shaft 38 is journalled to rotate in an elongated bearing tube or sleeve 42, see Figure 2, which forms one leg of a triangular bracket 44 curved to conform to the interior surface of the collar A.

These brackets 44 pivot on the upper part of shaft 28. For example, curved bracket 44 is formed at its lower end with an apertured lug 46, see Figure 2, while the bearing tube 42, as shown in Figure 6, is formed with an apertured bracket 48 pivoted on shaft 28 carried by a portion of the upper ring 10.

Each climbing wheel bracket 44 is formed like a right angle triangle with its 90 degree angle adjacent the upper ring 10. This 90 degree angle is formed with a web or plate 52 welded therein, which plate has a depending shaft 54 to which is secured one end of a cable 56. There are several of these cables, namely, 56, 56ª, 56ᵇ and 56ᶜ. They serve to link each of the four climbing wheel brackets 44 with a coil spring tension means. For example, as illustrated semi-diagrammatically in Figure 4, the cable 56 loops about a pulley 57 from one of the hereinbefore mentioned bracket carried shafts 54, the cable 56ª fastens around pulley 57ª to the shaft 54, the cable 56ᵇ loops about a pulley 57ᵇ to the next shaft 54, and the cable 56ᶜ loops around pulley 57ᶜ from the last shaft 54. Each opposite end of each of the cables terminates in a looped coupling 60 secured to the end of a coiled spring 61.

Figure 5:
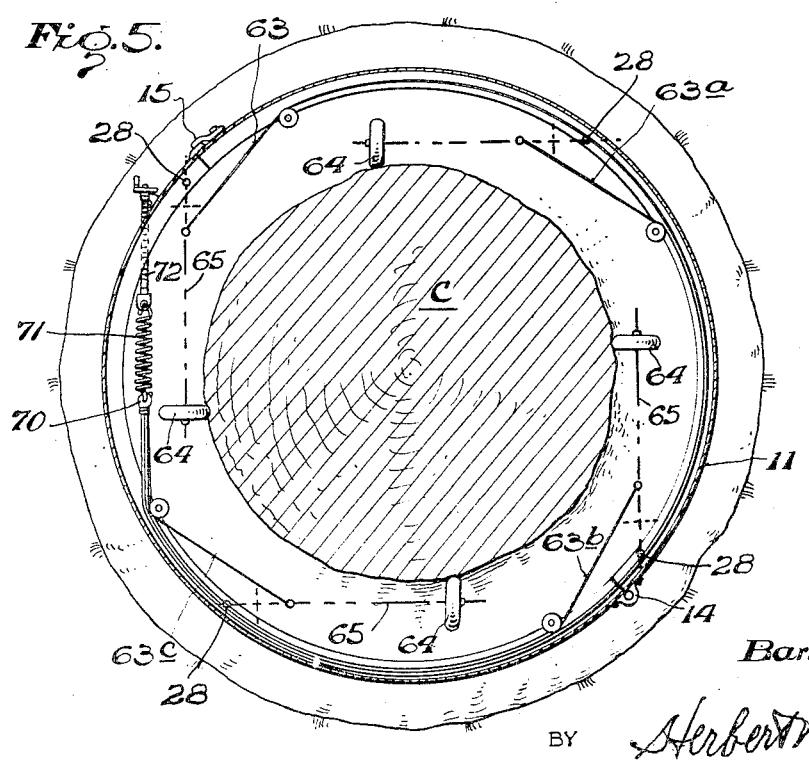
Figure 5 is a cross section view taken on line 5—5 of Figure 3 to illustrate the mounting of the trunk engaging guide wheels.

A similar arrangement of cables 63, 63ª, 63ᵇ, and 63ᶜ is provided adjacent the lower ring 11 for controlling the pressures of a group of centering wheels 64, see Figures 2 and 5. These guide wheels 64 are idler wheels arranged to rotate on the end of a curved shaft 65 carried by a bracket arm 66 formed at an end with aligned apertured lugs 67 and 68 journalled on the lower end of shafts 28. Each bracket arm 66 has welded to its underside a shaft 69 around which loop the several cables 63, 63ª and 63ᵇ in the same manner as above described in connection with the tension cables 56, 56ª, 56ᵇ, and 56ᶜ for the climbing mechanism. The coupling 70 connects to a coiled spring 71 and adjusts shaft 72 for the purpose of varying the inward pressure force of the guide wheels 64 against the tree trunk C.

The tension cables for the climbing wheels 40 and the tension cables for the guide wheels 64 are operable entirely independent of each other. The purpose of the mutual independence of both groups is to cope with the taper in the tree trunk as shown in Figure 3. The trunk taper is often very severe at the bases of the trees, for example, up to about 20 inches or 30 inches from the ground, but afterwards they maintain a reasonably constant taper all the way up. This base taper is generally of parabolic contour, as shown in Figure 3, and is apparent in palm trees of up to 25 inches in diameter, which represents about ninety per cent of the average trees to be trimmed.

Trimming mechanism

The frond cutting or trimming mechanism is all mounted from the upper ring 10, except for the electric drive motor 17, which is mounted on the lower ring 11. The motor 17 through bevel gears 80 and 81 drives a vertical sprocket shaft 82. This shaft 82 has keyed to it a sprocket wheel 83, which meshes with a driven sprocket chain 84.

The chain 84 encircles the outer circumference of the upper ring 10 and loops around several idler sprockets 85 mounted on pins 87 in bearing lugs 86, see Figures 1 and 2. It is the chain 84 which drivably connects to the oppositely mounted trolleys 90 and 91. These trolleys are each connected to a link of the chain 84 by stirrup members 92. Each trolley is similar in construction and comprises an angularly mounted grooved wheel 94 of insulated material such as a fibre sheave wheel at each end, and a U-shaped strap 95 curved downwardly over the drive chain 84. The strap 95 connects to the underpart of the trolley by bolt and nut 96 and the free end of the strap supports a rubber tired wheel 97, which rolls around the lower outer circumferential face of the upper ring 10 to steady the trolley and cutter saddle assemblies. The saddle assemblies pivotal axes are at points S—S and S'—S', respectively. Each trolley mounts the trimmer or cutter members 100, which members are rotated by electric motors 101 and 102. These motors are suspended by arms 103 and 104 secured to each side of the motor casing by screws or rivets 105. The arms 103 and 104 continue upward into an offset portion 107 and thence upward to secure to either side of a bearing sleeve 108 (see Figure 1) in which is mounted for rotation the stub shaft of the cutter members 100. Each offset or saddle portion is secured to an axle 107ª journalled at each end in the trolleys at points S—S and S'—S'. The lower end of the stub shaft of cutters 100 connects to a flexible shaft drive 109, well known in the art. The lower end of the flexible drive shaft 109 connects with a belt driven pulley 111 mounted on a saddle plate 112 formed with bearing openings for the pulley shaft 113 and for the drive shaft 115 of motor 101. The drive shaft 115 supports a pulley 116 around which a drive belt extends to drive the pulley 111.

Around the top rim of the upper ring 10 and separated therefrom by suitable insulation 120 is a switch controlled "hot" wire 121. This wire is held on by clips 122 and connects by lead 123, see Figures 1 and 7, to the electric motor 101, whereby power is supplied thereto for rotating the cutter members 100. A terminal on the end of lead 123 makes a sliding or slip connection with the wire 121 to thereby permit free rotation around the wire 121.

During the rotary action of the cutters, the motors 16 and 17 are also in operation to drive their respective mechanisms. For example, the motor 17 is connected to a suitable source of electric current such as generator G controllable by a suitable switch F, and when the circuit is closed by the switch F current is supplied to energize motor 17 and impart power to sprocket 83 to rotate drive chain 84 (see Figure 10). As chain 84 is rotated it also rotates the trolleys 90 and 91 by reason of the stirrup connections 92 from each trolley to the chain. The obvious result of the rotation of the trolleys causes the entire cutting mechanism to travel around the upper ring 10 and the trunk of the tree. As the cutting mechanism thus travels around the trunk at approximately 60 R. P. M. the weight of the suspended motors 101 and 102 causes them to swing out by centrifugal force in pivot connections S—S and S'—S' and thereby forces the rotating cutters 100 into engagement with the tree. These cutters may preferably rotate at about 1500 R. P. M. Also, for most efficient action one cutter or saw blade 100 is located, for example, a suitable distance, such as .800 inch below the other so that one blade is made to follow exactly in a helical path of the leading blade when the machine is climbing at its optimum rate of for example 8 feet per minute and the trolleys are rotating at 60 R. P. M. on the top collar or ring 10.

Operation

To operate the machine the motors 16 and 17 of the respective climbing and cutting mechanisms have their power leads connected to a multiple switch control I connected on some 75 feet or more of wire leads connecting with the source of electric current G and these switches may be controlled either selectively or simultaneously by the operator who holds the switch to energize the motors.

Prior to turning on the electric power by switch F, the machine is of course first placed around the base of the tree. For example, a marked link is taken out of both chains at about the location of the locking clamps, which are now released and the case collar or frame A is opened on the hinge 14. The positions of the cutter trolleys are assured "safe" by the location of the aforementioned "links" prior to opening.

The climbing wheels are set slightly larger than the trunk diameter of the tree to be trimmed.

With one man on each side the machine is lifted and brought against the trunk of the tree, at which time it is "closed" and locked. Chains 24 and 84 are linked up and the climbing mechanism is released so as to hug the trunk firmly and the machine is ready to start.

The operator starts the climbing motor 16 by means of a rheostat "throttle switch" R connected to the motor 16 by 75 feet of insulated flexible wire and the machine is allowed to climb up to the beginning of the work.

At this time the "cutting circuit" (both rotation of the trolleys and saws) is switched on and the trolleys begin to rotate on upper ring 10 at approximately 60 R. P. M. with the saw motors picking up their current from a stationary insulated "hot wire" 121 located on the ring 10 of the base collar A, the saws 100 turning at about 1500 R. P. M. Both the hot wire 121 and rotation motors 101 and 102 are fed the same voltage on a common circuit actuated by a throttle switch E (also on about 75 feet of wire), which is located with the "climbing switch" in the hands of the operator. The cutting saws 100 are brought against the trunk by the reversed action of centrifugal force exerted by the saw motors (see arrows in Figure 1) and transmitted through saddle mounting axes S—S and S'—S'; this and the rotation of the cutter trolley assemblies causes the saws to rotate around the trunk accomplishing the cutting action.

Due to the fact that one saw blade is located .800 inch below the other, one blade is made to follow exactly in the helical path of the leading blade when the machine is climbing at its optimum rate of 8 feet per minute, and the trolleys rotating at 60 R. P. M. on the collar 10. When the machine has finished cutting all the work the operator opens both switches and the trolleys come to their position of rest. The operator then sets the climbing motor 16 in reverse motion by operating the reversing switch J causing the machine to descend to the base of the tree where it is detached by the following procedure.

First, the trolleys are rotated to their safe position bringing the marked link into position for removal from chain 84. Chain 24 is rotated until its marked link is also in the safe or opening position and the link removed. Locking clamps 15 are released and the climbing mechanisms are locked at their present diametrical setting. The machine is then opened and removed from trunk.

While only one embodiment of the present invention has been illustrated and described, it is to be expressly understood that other arrangements of parts and combinations thereof may be made by others skilled in the art without departing from the scope of the present invention. To determine the scope of my invention reference should be had to the appended claims.

What I claim is:

1. A machine for cutting fronds from palm trees comprising a circumferential rotatable cutting mechanism travelling around a vertically movable carriage, trolley means for supporting said cutting mechanism for travel on and around said vertically movable carriage, said circumferential cutting mechanism including rotary cutter members mounted on said trolley means.

2. A machine for trimming growths from tree trunks comprising a main frame adapted to be mounted around a tree trunk, trunk engaging members mounted on the frame adapted to propel the machine up the trunk, power means for actuating said trunk engaging members, a trolley mounted on said main frame, a plurality of rotary cutter disks mounted to extend vertically a distance one above the other on said trolley, and second power means adapted to impart drive to said cutter means and propel the same around the circumference of the tree trunk while said cutters are rotated to cut growths from the tree trunks.

3. A machine for cutting fronds from palm trees comprising a frame adapted to clamp together around the trunk of a palm tree, guide members pivotally mounted at the base portion of said frame adapted to yieldably engage with the trunk, adjustable resilient means adapted to vary the engaging pressure of said guide members with the trunk, trunk engaging climbing members pivotally mounted in the said frame positioned adjacent the top thereof, adjustable resilient means adapted to regulate the engaging pressure of said climbing members, power means for driving said climbing members to thereby propel the frame upward along the trunk, rotatable cutter members revolvably mounted on the top rim of said frame, power means for revolving said cutter members around the tree trunk on the rim of the frame, one of said cutter members being mounted a distance below the other, and individual power means in driving connection with each of said cutter members rotating each cutter member as it travels around the tree trunk while said frame is propelled upward along the trunk by said climbing members.

4. A machine for cutting fronds from palm trees comprising a frame adapted to clamp together around the trunk of a palm tree, guide members pivotally mounted at the base portion of said frame adapted to yieldably engage with the trunk, adjustable resilient means adapted to vary the engaging pressure of said guide members with the trunk, chisel toothed wheels adapted to be rotated and to bite into the tree trunk, drive shafts for each of said wheels, including a vertical sprocket driven worm shaft and a horizontal shaft driven by said worm shaft, a drive sprocket at the lower end of each of said worm shafts, a motor driven chain for rotating said sprockets, a swingable bracket having an upper tubular bearing for rotatably mounting said horizontal shaft with one of said wheels keyed to the end of said horizontal shaft, a plurality of tension arms adapted to hold the said wheels against the tree trunk to thereby propel the said frame upward along the trunk as said wheels rotate, cutter disks rotating and travelling in a helical path around the circumference of the tree trunk, one of said disks being slightly higher along the trunk than the other to thereby travel around the trunk one in the helical path of the other as the frame is propelled upward, and electric motors drivably connected to rotate said cutter disks.

5. A machine for cutting fronds from palm trees comprising a frame adapted to clamp together around the trunk of a palm tree, guide members pivotally mounted at the base portion of said frame adapted to yieldably engage with the trunk, adjustable resilient means adapted to vary the engaging pressure of said guide members with the trunk, chisel toothed wheels adapted to be rotated and to bite into the tree trunk, drive shafts for each of said wheels, including a vertical sprocket driven worm shaft and a horizontal shaft driven by said worm shaft, a drive sprocket at the lower end of each of said worm shafts, a motor driven chain for rotating said sprockets, a swingable bracket having an upper tubular bearing for rotatably mounting said horizontal shaft with one of said wheels keyed to the end of said horizontal shaft, a plurality of tension arms adapted to hold the said wheels against the tree trunk to thereby propel the said frame upward along the trunk as said wheels rotate, cutter disks rotating and travelling in a helical path around the circumference of the tree trunk, one of said disks being slightly higher along the trunk than the other to thereby travel around the trunk one in the helical path of the other as the frame is propelled upward, said motors and cutters being mounted to travel on a track in a helical path upward around the tree trunk and a drive means including another electric motor connected to said cutter motors imparting power to drive the said cutter motors in said helical path around the tree trunk.

6. In a tree trimming machine, an annular frame formed of pivotally connected sections disposed around a standing tree trunk and supported thereby, a hot trolley wire around the top rim of said frame, trolleys mounted on said wire, a power driven cutter mounted on said trolleys, motors for driving said trolleys, motors for rotating said cutters, said cutters engaging the tree trunk when the trolleys are driven around the tree trunk, and motor driven traction means carried by the frame for engagement with the tree trunk for moving the machine lengthwise thereof, the simultaneous rotation of said cutters, travel of said trolleys and lengthwise movement of said frame causing the cutters to execute a helical cutting operation around the tree trunk.

7. A machine for trimming the fronds from palm trees comprising a frame pivoted in half sections to thereby completely encircle the trunk of a palm tree, including climbing means for mounting said frame and propelling the same upward along the trunk of the tree, and cutter disks mounted for helical travel around the trunk of the tree on the upper rim of said frame, said cutter disks being rotatably driven by electric motors, said motors and their respective cutters being mounted upon a circular trolley connected to a source of electric power, said electric cutter motors being balanced on said trolley to thereby swing radially outward from the tree trunk by centrifugal force as they are driven around the said trolley, to thereby direct the cutters into engagement with the tree trunk.

8. A machine for trimming the fronds from palm trees comprising a frame pivoted in half sections to thereby completely encircle the trunk of a palm tree, including climbing means for mounting said frame and propelling the same upward along the trunk of the tree, and cutter disks mounted for helical travel around the trunk of the tree on the upper rim of said frame, said cutter disks being rotatably driven by electric motors, said motors and their respective cutters being mounted upon a circular trolley connected to a source of electric power, said electric cutter motors being balanced on said trolley to thereby swing radially outward from the tree trunk by centrifugal force as they are driven around the said trolley, to thereby direct the cutters into engagement with the tree trunk, said cutters each being mounted in a vertical plane one above the other and so spaced and so proportioned circumferentially around the trolley as to travel in a helical path around the trunk during the cutting operation.

BARRY N. JONES.

REFERENCES CITED

The following references are of record in the file of this patent:

UNITED STATES PATENTS

| Number | Name | Date |
|---|---|---|
| 170,797 | Adams | Dec. 7, 1875 |
| 397,114 | Dolsen | Feb. 5, 1889 |
| 742,447 | Kidder | Oct. 27, 1903 |
| 962,003 | Burdick et al. | June 21, 1910 |
| 1,243,294 | Hruska | Oct. 16, 1917 |
| 1,299,289 | Berg | Apr. 1, 1919 |
| 2,109,414 | Deiters et al. | Feb. 22, 1938 |
| 2,174,525 | Padernal | Oct. 3, 1939 |
| 2,477,922 | Emery | Aug. 2, 1949 |
| 2,482,392 | Whitaker | Sept. 20, 1949 |

FOREIGN PATENTS

| Number | Country | Date |
|---|---|---|
| 722,254 | France | Dec. 28, 1931 |
| 233,629 | Switzerland | Nov. 1, 1944 |